United States Patent [19]

Kneuer et al.

[11] 3,842,399

[45] Oct. 15, 1974

[54] REPETITIVE BYTE RECOGNITION CIRCUIT

[75] Inventors: Joseph George Kneuer, Fair Haven; William Joseph Lawless, Middletown, both of N.J.

[73] Assignee: Bell Telephone Laboratories, Incorporated, Murray Hill, Berkeley Heights, N.J.

[22] Filed: Jan. 2, 1974

[21] Appl. No.: 429,563

[52] U.S. Cl. .................340/146.1 BA, 178/69.5 R, 179/15 AE, 179/15 BS

[51] Int. Cl. ............................................ H04l 1/08

[58] Field of Search.............. 178/23 A, 50, 69.5 R; 179/15 AE, 15 BS, 15 BV; 340/146.1 BA; 325/325

[56] References Cited

UNITED STATES PATENTS 3,772,649 11/1973 Haselwood et al. ....... 340/146.1 BA 3,798,549 3/1974 Ollinger et al. ........... 340/146.1 BA

*Primary Examiner*—Malcolm A. Morrison
*Assistant Examiner*—R. Stephen Dildine, Jr.
*Attorney, Agent, or Firm*—Roy C. Lipton

[57] ABSTRACT

Data bytes, encoded into successive groups of n repetitive data bytes, are recovered by selecting a first data byte in each of the successive groups. The first data byte is identified by detecting mismatches in the corresponding bits of successive data bytes. A data byte selector which selects every $n^{th}$ byte is aligned in time with the identification of this first data byte and the first data byte of each successive group is selected. In the presence of transmission errors there occurs more than one mismatched data byte within the span of $n$ data bytes. In this event the identified data byte is ignored and the selection of a data byte is accomplished independent of the alignment in time between the data byte selector and the identified data byte.

10 Claims, 3 Drawing Figures

REPETITIVE BYTE RECOGNITION CIRCUIT

FIELD OF THE INVENTION

This invention relates to data byte recovery circuits and, more particularly, to a circuit for recovering data bytes encoded into successive groups of repetitive data bytes.

DESCRIPTION OF THE PRIOR ART

In known digital communication systems, information is conveyed in the form of data bytes. It is sometimes desirable in such systems to accomplish signal rate conversion. One technique, described in the application of A. C. Carney-M. P. Cichetti, Jr.-J. G. Kneuer-D. W. Rice, Ser. No. 256,827, filed May 25, 1972, and which issued on Feb. 26, 1974, as Pat. No. 3,794,768, is to repeat a data byte a plurality of times, such as $n$ times, and to transmit these repeated data bytes in a group. To accomplish rate up-conversion using this technique, an incoming low-speed data byte is repeated $n$ times, the repeated data bytes are assembled into groups, and the groups of repeated data bytes are retransmitted at the consequent higher data rate. The corresponding rate down-conversion is accomplished by recovering one of the repeated data bytes from each group and discarding the remaining data bytes.

A problem in using byte repetition to accomplish rate conversion is the time delay that occurs when the rate down-conversion from the high-speed data rate to the lower speed data rate is performed. This time delay results from the manner in which a data byte is selected from a group of repetitive data bytes. In the prior art a random numbered one of the data bytes in the group of repetitive data bytes is selected and sent to a low-speed data sink. Thereafter, each $n^{th}$ byte is selected, whereby the correspondingly numbered data byte in each subsequent group is selected and similarly sent to the low-speed data sink. This method of data byte selection introduces a time delay into the rate down-conversion which is equal to the interval between the first data byte in the group and the data byte which was heretofore randomly chosen.

It is therefore an object of this invention to reduce the time delay inherent in prior art recovery methods by selecting the first data byte in each group of repetitive data bytes.

In digital communication systems it is conceivable that errors will occur during transmission. Therefore, in the system herein under consideration, the possibility exists that data bytes within a group will contain errors. It is imperative that the presence of errors will not prevent the selection of the first data byte in the groups of repetitive data bytes.

It is therefore a further object of this invention to select the first data byte in groups of repetitive data bytes notwithstanding the presence of errors in the data bytes.

SUMMARY OF THE INVENTION

In accordance with the invention, mismatches are detected in the corresponding bits of successive data bytes to identify the first data byte in a group of $n$ repetitive data bytes. A data byte selector which selects every $n^{th}$ byte is aligned in time with this identified data byte. This results in the selection of each $n^{th}$ data byte subsequent to this first data byte identification to thereby recover the first data byte in the subsequent groups. More specifically, data byte selection is provided by a recycling $n$ byte counter which selects the byte being received when the counter is at a predetermined (zero) count. Aligning of the selector counter is provided by a second $n$ byte counter which is started by the mismatch detection and places the selector counter in the zero count upon counting $n$ bytes subsequent to the mismatch detection.

In accordance with a further feature of this invention, transmission errors are presumed when more than one mismatched data byte is detected within the span of n data bytes. In this event the byte identification derived from the mismatch detection is ignored, the selection of a data byte is accomplished independent of the mismatch detection by selecting the $n^{th}$ data byte after the previous selection and a new selector alignment is performed when transmission errors cease.

The foregoing and other objects and features of this invention will be more fully understood from the following description of an illustrative embodiment thereof taken in conjunction with the accompanying drawings.

DETAILED DESCRIPTION

Figure 1:
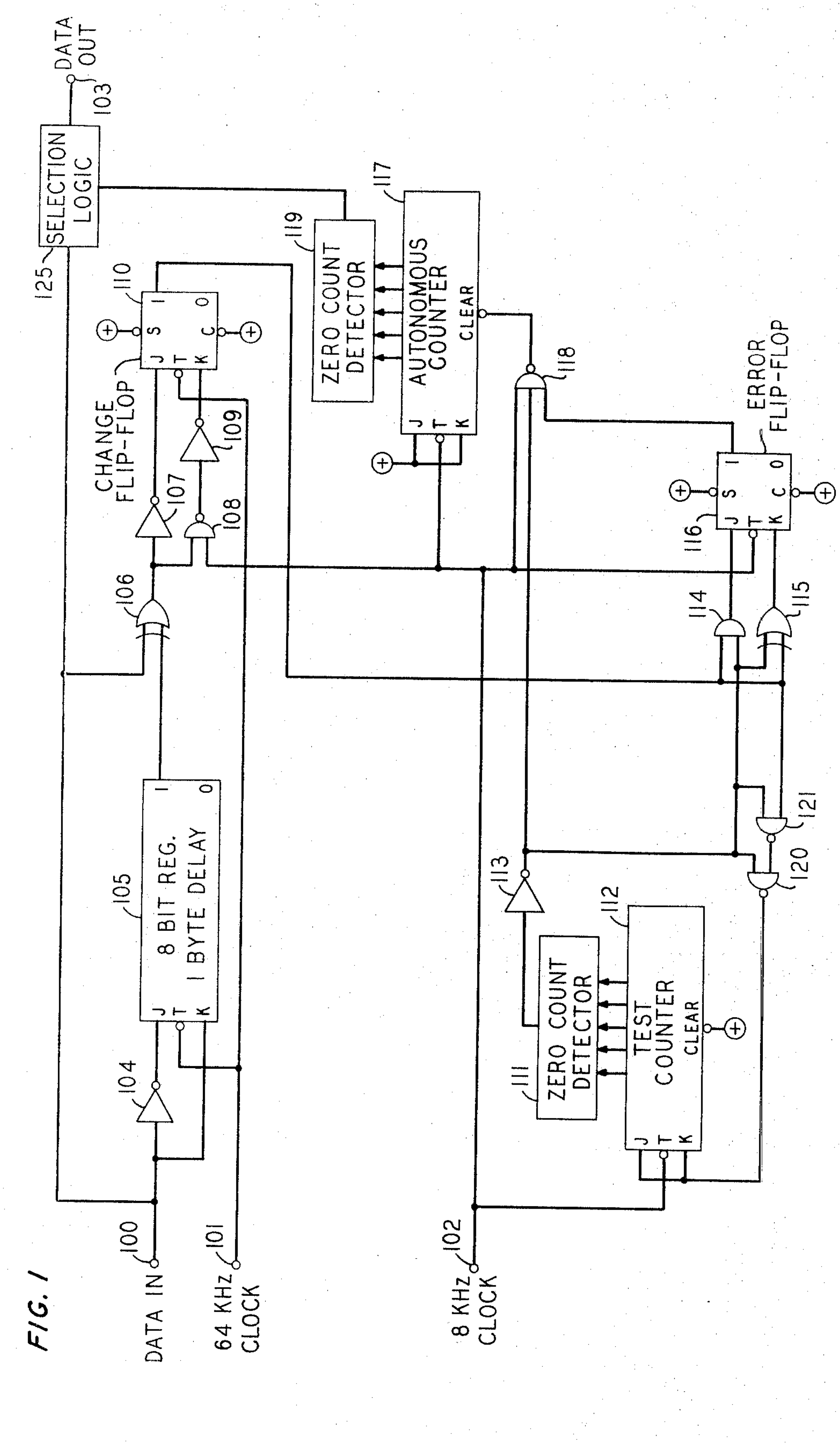
FIG. 1 depicts, in schematic form, a repetitive byte recognition circuit for recovering the first data byte from each of a plurality of successive groups of $n$ repetitive data bytes in accordance with this invention.

The circuitry in FIG. 1 is dedicated to selecting the first data byte from each of a plurality of successive groups of data bytes, notwithstanding the possible occurrence of errors in the data bytes. The selection is generally accomplished by identifying the first data byte in a group, aligning a data byte selector in time therewith, and thereafter selecting every $n^{th}$ data byte. The format of the data upon which the circuitry operates is shown as waveform 3 in FIGS. 2A and 2B. Therein it is shown that the incoming data is divided into successive groups, as defined above the waveform, each group having five repetitive data bytes. Each data byte consists of eight binary bits, with the logical 0 state of a particular bit being represented by a shaded area in waveform 3 and a logical 1 state being represented by a nonshaded area.

The manner in which the circuitry in FIG. 1 functions can be divided into four basic steps. They are:

I. Detecting Mismatches in the Corresponding Bits of Successive Data Bytes

Data bytes within a group are identical. Therefore, the detection of a mismatched data byte signifies the beginning of a new group and is the first step in selecting the first data byte in a group. The detection is generally accomplished by register 105, flip-flop 110 and gates 104–109.

II. Detecting Errors in the Data Bytes

The occurrence of an error causes mismatched data bytes within a group rather than at the boundaries between groups. As selection of the first data byte in a group is based upon the detection of mismatched data bytes, it is imperative to distinguish between valid mismatched data bytes and mismatched data bytes resulting from errors. Error detection is generally accomplished by test counter 112, zero count detector 111, flip-flop 116 and gates 113-115.

III. Selection of the First Data Byte in the Absence of Errors

Test counter 112, zero count detector 111 and gates 113 and 118 identify the fifth data byte subsequent to a detected mismatched data byte. If this is a valid mismatched data byte (i.e., no errors) the identified data byte is the first data byte in a group of data bytes. Based on this identification, the operation of the data byte selector, comprising autonomous counter 117, zero count detector 119 and selection logic 125, is aligned in time with the identified data byte. The data byte selector selects this data byte and every fifth data byte thereafter or the first data byte from each successive group of data bytes.

IV. Selection of the First Data Byte in the Presence of Errors

An error results in a mismatched data byte within a group of data bytes. When this occurs, the identification signal based on the detection of this mismatched data byte is suppressed. Autonomous counter 117, zero count detector 119 and selection logic 125 then operate independent of the alignment with the identified data byte and select the fifth data byte subsequent to the last data byte selected.

Detecting Mismatches in the Corresponding Bits of Successive Data Bytes

A first step in selecting the first data byte in each of a plurality of successive data bytes is to identify the point at which one series of repetitive data bytes meets a successive series of repetitive data bytes, the successive series being different. To accomplish this mismatches are detected in the corresponding bits of successive data bytes.

Incoming encoded data represented by waveform 3 is received on terminal 100, the data having an 8-kHz byte rate and a 64-kHz data rate. A 64-kHz and an 8-kHz clock signal (shown in FIGS. 2A and 2B, waveforms 1 and 2) are applied to terminals 101 and 102, respectively. The incoming data bits are passed through inverter 104, and clocked into 8-bit shift register 105 at the 64-kHz clock rate. Register 105 provides an 8-bit or one byte delay.

The data on terminal 100 and the output of shift register 105 are simultaneously applied to EXCLUSIVE OR gate 106. Therefore, each data byte appearing on terminal 100 is applied, bit by bit, to one input of EXCLUSIVE OR gate 106, while the inverse of the previously received data byte, delayed by register 105, is simultaneously applied, bit by bit, to the other input of EXCLUSIVE OR gate 106. In this manner each data byte is compared, bit by bit, with the byte previously received on terminal 100. Each time a mismatch occurs between the corresponding bits in the successive data bytes, either two 1 bits or two 0 bits are applied to the inputs of gate 106 and the output of gate 106 goes low. This is depicted as waveform 4 in FIG. 2A. It is assumed that bit 3 of the first data byte shown is different than bit 3 of the preceding data byte which is not shown. The low output of gate 106 applies a high through gate 107 on the J input of CHANGE flip-flop 110, which is then toggled to the SET state by the subsequent negative transition of the 64-kHz clock signal. (See FIG. 2A, waveform 5).

Therefore, each time a mismatch occurs in the corresponding bits of successive data bytes, CHANGE flip-flop 110 is set, thereby detecting the mismatched data byte.

CHANGE flip-flop 110 is cleared during the next 8-kHz clock pulse subsequent to any mismatched data byte, if at that time the data bits of the compared data bytes are again identical. When the data bits are identical, the output of gate 106 is high, which places a high on one input of gate 108. The remaining input of gate 108 goes high in conjunction with the 8-kHz clock pulse. This forces the output of gate 108 low and output of inverter 109 high, which places a high on the K input of CHANGE flip-flop 110. Flip-flop 110 is then toggled to the CLEAR position by the 64-kHz clock signal.

Detecting Errors in the Data Bytes

In the absence of errors in the incoming data, the data bytes within each group are identical. Therefore, when the data is error free, there can, at most, be only one mismatched data byte within the span of five data bytes and that mismatched data byte will be the first data byte in a group. When more than one mismatched data byte is detected in the span of five data bytes an error has occurred. The occurrence of more than one mismatched data byte within the span of five data bytes is identified by ERROR flip-flop 116 in conjunction with test counter 112. This is accomplished as follows:

CHANGE flip-flop 110, being SET by a mismatch, places a high on one input of gate 121. Assume at this time that test counter 112 is in the "zero count" state and the output of zero count detector 111 is low. (Zero count detector 111 consists of combinational logic so arranged so as to detect the "zero count" state of test counter 112). The output of inverter 113 is high, which places a high on the remaining input of gate 121 and on one input of gate 120. Therefore, when CHANGE flip-flop 110 is SET and test counter 112 is in the "zero count" state, the output of gate 121 is low and the output of gate 120 is high. This enables test counter 112 by placing a high on its J and K inputs. The counter then begins its count cycle, starting with the first 8-kHz clock pulse subsequent to the detected mismatched data byte. Once started, test counter 112 moves off the "zero count," gate 113 goes low and gate 120 is maintained high so that the counter must count five 8-kHz clock pulses (i.e., five data bytes) before returning to the "zero count" state.

If another mismatched data byte is detected within the count cycle of test counter 112, it signifies that an error has occurred in the incoming data. When this occurs, the output of inverter 113 is low (test counter 112 counting) and the output of CHANGE flip-flop 110 is high (mismatch detected). This forces the output of gate 114 low and the output of EXCLUSIVE OR gate 115 high. This places a high on the K input of ERROR flip-flop 116 and a low on the J input of the flip-flop through gate 114. The subsequent negative transition of the 8-kHz clock clears ERROR flip-flop 116.

The clearing of ERROR flip-flop 116 signifies the occurrence of second mismatched data byte within the span of five data bytes and, therefore, the occurrence of an error in the data bytes.

ERROR flip-flop 116 is returned to the SET state with the first detected mismatched data byte subsequent to the completion of the count cycle of test counter 112. At this time, the output of CHANGE flip-flop 110 is high (mismatch detected) and the output of gate 113 is high (test counter 112 in "zero count" state). Therefore, the output of gates 114 and 115 are high and low respectively, which places a high on the J input of ERROR flip-flop 116 and a low on the K input. Flip-flop 116 is toggled to the SET state with the subsequent 8-kHz clock pulse.

Selection of the First Data Byte in the Absence of Errors

The selection of the first data byte from each of the successive groups of data bytes is accomplished by autonomous counter 117, zero count detector 119 and selection logic 125, operating in conjunction with test counter 112 and zero count detector 111.

Autonomous counter 117 is a free-running counter. It is clocked continuously by the 8-kHz clock signal, beginning in a "zero count" state, counting five 8-kHz clock pulses (i.e., five data bytes) and returning to the "zero count" state. Zero count detector 119 consists of combinational logic so arranged so as to detect the "zero count" state of autonomous counter 117, with the output lead of zero count detector 119 high when autonomous counter 117 is in the "zero count" state and low at all other times.

Autonomous counter 117, zero count detector 119 and selection logic 125 in and of themselves function to select one data byte (not necessarily the first data byte) from each of the successive groups of data bytes. Assume, for example, that autonomous counter 117 is so aligned in its count so as to begin counting (from the zero count) with the third 8-kHz clock pulse (third data byte) in group 1. It will begin counting at this point, count five 8-kHz clock pulses and return to the "zero count" state with the second 8-kHz clock pulse in group 2. This cycle will be repeated for successive groups. Each time autonomous counter 117 reaches the "zero count" state, the output of zero count detector 119 goes from a low to a high state. In response to the high state, selection logic 125 recovers the data byte which is presently being applied by terminal 100. (Selection logic 125 consists of combinational gate logic so arranged so as to recover the data byte being applied to terminal 100 in response to this high state on the output lead of zero count detector 119). Therefore, if autonomous counter 117 begins counting with the third 8-kHz clock pulse in any group and returns to the "zero count" with the second pulse in the next group, the second data byte in this next group will be selected and recovered.

To recover the first data byte from each of the successive groups, the functions performed by test counter 112 and zero count detector 111 are required. As previously described, test counter 112 is enabled by each mismatched data byte and counts five data bytes before returning to the "zero count" state. In the absence of errors in the incoming data, the data byte which is five data bytes subsequent to any mismatched data byte is the first data byte in a group of data bytes. Therefore, test counter 112 begins counting with the first data byte in a given group, counts five data bytes (or one byte repetition group), and returns to the "zero count" state in conjunction with the first data byte in the next successive group.

Figure 2A:
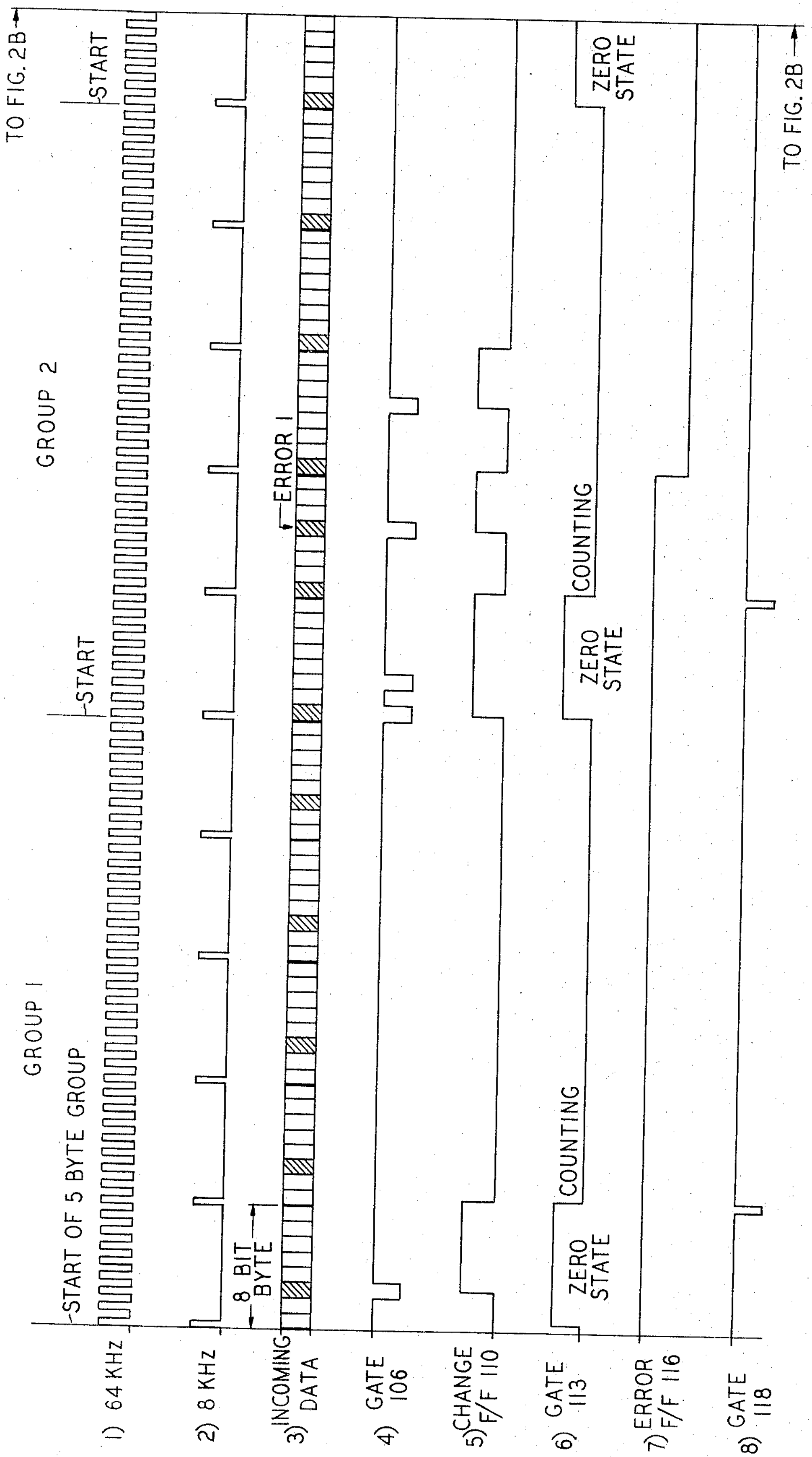
FIGS. 2A and 2B, when arranged side by side, show various timing waves which represent signals and pulses produced by the repetitive byte recognition circuit.
Figure 2B:
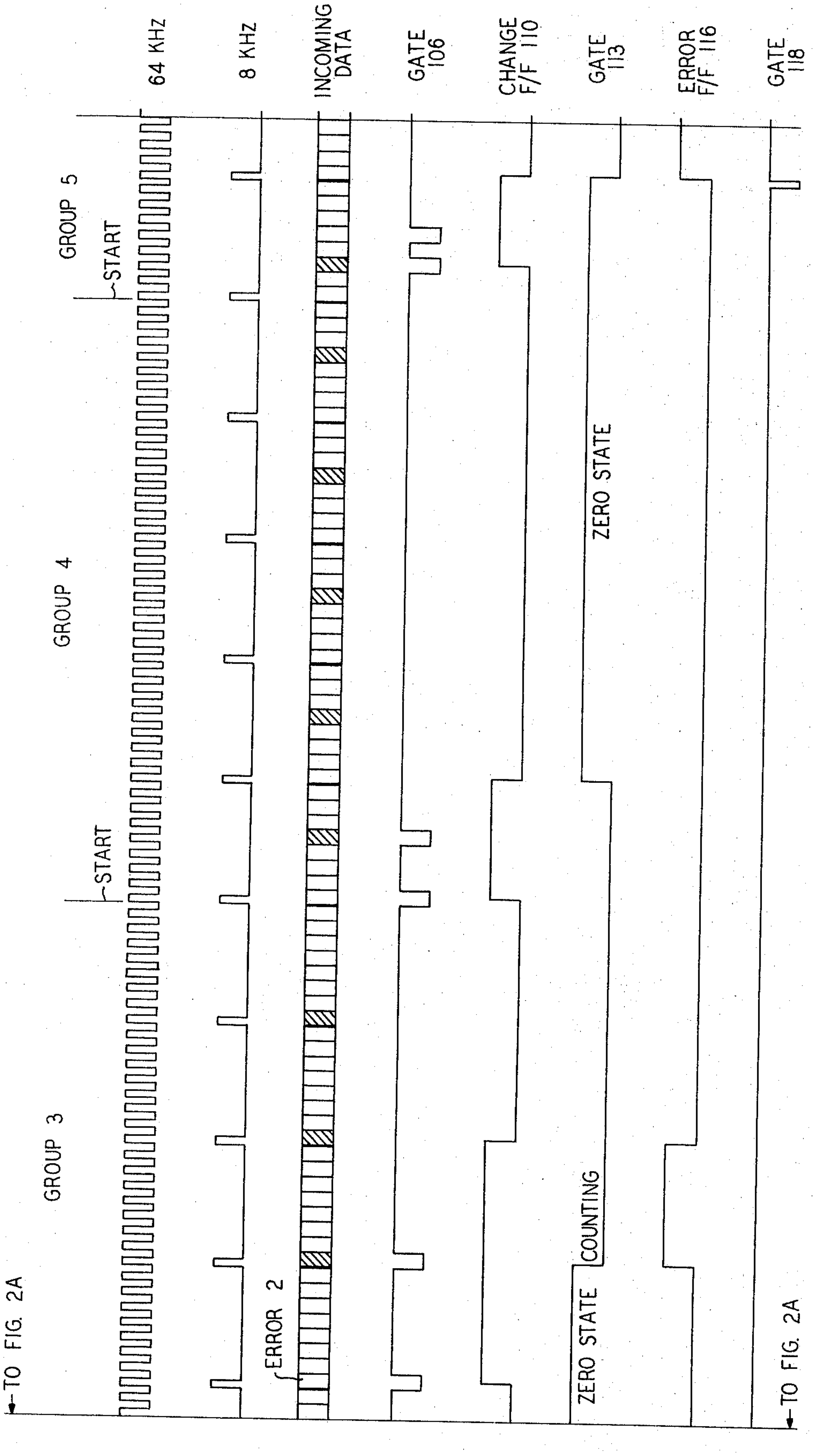

The output of inverter 113, whose output indicates the status of test counter 112 as previously described is shown in waveform 6, FIG. 2A. When test counter 112 begins its count with the first 8-kHz clock pulse subsequent to the detected mismatched data byte, the output of gate 113 goes low and when the counter returns to the "zero count" state in conjunction with the first data byte in group 2, the output of gate 113 goes high. Therefore, in the absence of errors in the incoming data, the output of gate 113 going high serves to identify the first data byte in a group of repetitive data bytes.

The output of gate 113 is directed to one input of gate 118. An additional input to gate 118 is connected to the 1 output of ERROR flip-flop 116. As previously described, in the absence of errors, the 1 output of this flip-flop is high. When the third input of gate 118 goes high (i.e., the 8-kHz clock signal) the output of gate 118 goes low. Assuming counter 117 is in a random count, the low on the CLEAR input of autonomous counter 117 clears the counter and forces it to the "zero count" state. Autonomous counter 117 is therefore aligned, in time, with the test counter and thus with the detection of the mismatched data byte.

Therefore, test counter 112, zero count detector 111 and gate 113 serve to identify the data byte occurring five data bytes subsequent to any given mismatched data byte. In the absence of errors in the incoming data, this data byte is the first data byte in a group of data bytes. This identification signal forces autonomous counter 117 to the "zero count" state, aligning the count cycle of autonomous counter 117 with the first data byte, whereupon the first data byte in a given group is recovered. Thereafter, in the absence of errors, autonomous counter 117 free runs, restoring every fifth 8-kHz clock pulse so that zero count detector 119 selects the first data byte of each of the successive groups, as previously described. In this manner, the first data byte in each of the successive groups of data bytes is selected and recovered.

Selection of the First Data Byte in the Presence of Errors

An error is defined as the occurrence of more than one byte mismatch within the span of five data bytes. This criteria is followed in all cases, including the situation where there are successive identical coded data byte groups; that is, ten or more repetitive bytes that are the same.

In waveform 3, there is disclosed a data byte stream wherein the second encoded group (the five repetitive bytes in group 2) is the same as the third encoded group (the five repetitive bytes in group 3) and wherein the fifth bit of the second byte in group 2 and the first bit of the second byte in group 3 are in error.

The first byte of the second group is a mismatched data byte. CHANGE flip-flop is SET and test counter 112, having previously been aligned with the mismatched data bytes, is in the "zero count" state. At the end of the byte, the 8-kHz clock pulse passes through gate 118 (waveform 8) to align in time autonomous counter 117 with counter 112 and the mismatched data byte. Test counter 112 also begins counting with the 8-kHz clock pulse; and will thereafter return to the "zero count" state with the reception of the first data byte in group 3.

The occurrence of the error in group 2 causes a second mismatched data byte while test counter 112 is counting and therefore within the span of five data bytes. CHANGE flip-flop being set and test counter 112 counting, (causing the output of gate 113 to be low), applies one low input and one high input to EXCLUSIVE OR gate 115, causing the output of gate 115 to go high, thereby placing a high on the K input of ERROR flip-flop 116. ERROR flip-flop 116 is then cleared in the manner previously described and will stay cleared until the occurrence of the first mismatch subsequent to the completion of the count cycle of test counter 112. (See waveform 7).

With the ERROR flip-flop cleared, the 1 output goes low, disabling gate 118. Therefore, when test counter 112 returns to the "zero count" state the 8-kHz clock pulse is prevented from reaching autonomous counter 117, thereby preventing the forced clearing of the counter and preventing the aligning of the counter with test counter 112 and the mismatched data byte. Counter 117 is therefore rendered free running, selecting every fifth data byte independent of the cycling of counter 112. Note, however, that counter 112 is still aligned with the valid mismatched data bytes and if the next byte group has no errors, flip-flop 110 will be set by the next valid mismatched data byte and normal operation will thereafter be resumed.

In the example in waveform 3, the group 3 bytes are identical to the preceding group 2 bytes and the second data byte in the group contains an error. Therefore, the error constitutes the first mismatched data byte in group 3.

CHANGE flip-flop 110 is set by the error in group 3. (See waveform 5). Test counter 112, which has remained in the "zero count" state in the absence of a valid mismatched data byte, begins its count with the 8-kHz clock pulse subsequent to the error in the third data byte in group 3. At the same time, ERROR flip-flop 116, which was previously cleared by the error in group 2 is again set.

The fourth data byte in group 3 reverts to the correct value and therefore differs from the third byte which is in error. This reversion constitutes the second mismatched data byte within the span of five data bytes. Test counter 117 is counting and ERROR flip-flop 116 is again cleared in the manner previously described, thereby maintaining gate 118 in a disabled condition.

Test counter 112 returns to the zero count state in conjunction with the second data byte in group 4. It remains in this state until the detection of the mismatched data byte in group 5. It thereupon resumes counting in the manner previously described, again aligned with the mismatched data bytes.

In the absence of a clearing signal, autonomous counter 117, zero count detector 119 and selection logic 125 continue to operate normally, independent of the alignment in time with the mismatched data byte, selecting each fifth data byte subsequent to the last selected data byte. Since the last data byte selected was the first data byte of the previous group, the data byte now selected is the first data byte of the present group. Therefore, the first data byte in each of the successive groups is selected and recovered notwithstanding the presence of errors in the incoming data.

One additional type of error merits brief consideration. It is conceivable that catastrophic failure will occur during transmission of the data bytes. In this instance, the incoming data can be completely random, or can contain multiple errors. The circuit herein described cannot fully guard against such failure and will incorrectly identify and select certain random byte patterns which occur with low probability. However, when the incoming data reverts to structured groups of repetitive data bytes, test counter 112 will regain alignment with the data bytes and force autonomous counter 117 back into alignment therewith, in the manner previously described. Thereafter, the circuit will perform as was hereinbefore described.

Although a specific embodiment of this invention has been shown and described, it will be understood that various modifications may be made without departing from the spirit of this invention.

What is claimed is:

1. A circuit for recovering multibit data bytes encoded into successive groups of $n$ repetitive data bytes, comprising, means for selecting every $n^{th}$ one of the encoded data bytes;

means for detecting mismatches in corresponding bits of successive encoded data bytes; and means repsonsive to the mismatch detection for aligning, in time, the operation of the selecting means.

2. A circuit in accordance with claim 1 wherein the aligning means includes error count means responsive to the mismatch detection by the detecting means for indicating a second mismatched data byte within the span of an $n$ byte count; and means responsive to the indication of the second mismatched data byte for rendering the operation of the selecting means independent of the aligning means.

3. A circuit in accordance with claim 2 wherein the error count means includes $n$ byte count means responsive to the mismatch detection for initiating an $n$ byte count interval and means responsive to a mismatch detection during the $n$ byte count interval for indicating the second mismatched data byte.

4. A circuit in accordance with claim 1 wherein the selecting means includes means for counting $n$ encoded data bytes and means for enabling data byte selection in response to a predetermined state of the counting means.

5. A circuit in accordance with claim 4 wherein the aligning means further includes means for identifying the $n^{th}$ data byte subsequent to the mismatched data byte.

6. A circuit in accordance with claim 5 wherein there is further included means for placing the counting means into the predetermined state in response to the identification of the $n^{th}$ data byte subsequent to the mismatched data byte, whereby data byte selection is aligned in time with the identified data byte.

7. A circuit in accordance with claim 6 wherein the aligning means includes second count means for counting n data bytes and means responsive to the detection of a mismatch for enabling said second count means.

8. A circuit for aligning in time the counting cycle of an $n$ count binary counter with a predetermined data byte in each of a plurality of successive groups of $n$ repetitive data bytes, the circuit comprising, means for detecting mismatches in the corresponding bits of successive data bytes;

means responsive to the detecting means for identifying the $n^{th}$ data byte subsequent to the mismatched data byte; and means responsive to the identifying means for setting the binary counter to a predetermined count state.

9. A circuit in accordance with claim 8 wherein the identifying means includes means for counting $n$ data bytes subsequent to the mismatched data byte and means enabled by the detected mismatch for enabling the counting means.

10. A circuit in accordance with claim 9 wherein there is further included means responsive to the predetermined count state of the binary counter for recovering the predetermined data byte aligned in time therewith.

* * * * *